United States Patent
Couey et al.

(10) Patent No.: US 8,615,335 B2
(45) Date of Patent: Dec. 24, 2013

(54) PROGRESSIVE TAKEOFF THRUST RAMP FOR AN AIRCRAFT

(75) Inventors: Lyle M. Couey, Kirkland, WA (US);
Keith D. Parsons, Renton, WA (US)

(73) Assignee: The Boeing Company, Chicago, IL (US)

( * ) Notice: Subject to any disclaimer, the term of this patent is extended or adjusted under 35 U.S.C. 154(b) by 1130 days.

(21) Appl. No.: 12/212,144

(22) Filed: Sep. 17, 2008

(65) Prior Publication Data

US 2010/0070112 A1    Mar. 18, 2010

(51) Int. Cl.
*G01C 23/00* (2006.01)

(52) U.S. Cl.
USPC ............................... 701/3; 244/62; 244/188

(58) Field of Classification Search
USPC ..................... 701/3, 15; 244/62, 188
See application file for complete search history.

(56) References Cited

U.S. PATENT DOCUMENTS

| | | | |
|---|---|---|---|
| 3,892,374 A * | 7/1975 | Lambregts | 244/182 |
| 4,021,010 A * | 5/1977 | Bliss | 244/182 |
| 4,133,503 A * | 1/1979 | Bliss | 244/188 |
| 4,646,243 A * | 2/1987 | Graupp et al. | 701/120 |
| 4,672,548 A | 6/1987 | Greeson et al. | |
| 4,763,266 A * | 8/1988 | Schultz et al. | 701/10 |
| 4,891,642 A * | 1/1990 | Muller | 340/968 |
| 5,053,767 A * | 10/1991 | Zweifel et al. | 340/968 |
| 5,984,229 A | 11/1999 | Hollowell et al. | |
| 6,282,466 B1 * | 8/2001 | Nolte et al. | 701/11 |
| 6,437,707 B1 | 8/2002 | Johnson | |
| 2008/0249671 A1 * | 10/2008 | Remy | 701/3 |
| 2009/0110541 A1 * | 4/2009 | Southwick et al. | 415/119 |

FOREIGN PATENT DOCUMENTS

| | | | | |
|---|---|---|---|---|
| EP | 258498 A1 * | 3/1988 | | G05D 1/06 |
| EP | 1926005 A1 * | 5/2008 | | G05D 1/10 |

OTHER PUBLICATIONS

Flight Operations Briefing Notes—Takeoff and Departure Operations—Understanding Takeoff Speeds, FOBN Reference: FLT_OPS—TOFF_DEP—SEQ 07—REV 01—Aug. 2004, pp. 1-8. http://www.airbus.com/store/mm_repository/safety_library_items/att00003116/media_object_file_FLT_OPS-TOFF_DEP_SEQ07.pdf.

* cited by examiner

Primary Examiner — John Q Nguyen
Assistant Examiner — Jordan S Fei
(74) Attorney, Agent, or Firm — Yee & Associates, P.C.

(57) ABSTRACT

A method is presented for controlling thrust generated by aircraft engines. Engine thrust is controlled based on aircraft groundspeed and airspeed during the initial part of takeoff. Limiting thrust at low groundspeed during the initial phase of takeoff has significant benefits that reduce engine stress during this brief but critical phase leading to flight. Logical elements combine both groundspeed and airspeed in such a way that the operator perceives a smooth progressive thrust increase consistent with normal engine operation.

19 Claims, 9 Drawing Sheets

PROGRESSIVE TAKEOFF THRUST RAMP FOR AN AIRCRAFT

BACKGROUND INFORMATION

1. Field

The present disclosure relates generally to aircraft and in particular to a method and apparatus for controlling the flight of an aircraft. Still more particularly, the present disclosure relates to a method, apparatus, and computer program product for controlling thrust generated by the engine of an aircraft.

2. Background

Takeoff is a phase of flight when an aircraft transitions from moving along the ground to flying in the air. An aircraft may make this transition when a takeoff speed is reached. The takeoff speed for an aircraft may vary based on a number of factors. These factors include, for example, air density, aircraft gross weight, aircraft configuration, and other suitable factors.

The speed needed for a takeoff is relative to the motion of the air. For example, headwind reduces the amount of groundspeed at the point of takeoff. In contrast, a tailwind increases the groundspeed at the point of takeoff.

The amount of thrust generated by an engine may affect the maintenance schedule required for an engine. For example, when crosswinds are present, the air into an inlet for an engine may separate. This separation of air may provide poor aerodynamics with respect to fan blades within the engine. If the engine is providing a high-level thrust, poor aerodynamics may cause vibrations on the fan blades.

These vibrations may result in requiring more frequent replacement or maintenance of the blades. This type of increased maintenance increases cost and makes the aircraft unavailable more often. One solution is to restrict engine power to a selected level until the forward speed is such that adverse aerodynamics at an inlet of an engine no longer occurs.

SUMMARY

In one advantageous embodiment, a method is presented for controlling thrust generated by an aircraft. A command is received for a selected level of thrust for the aircraft. A level of thrust provided by an engine for the aircraft is controlled based on a groundspeed and an airspeed of the aircraft in response to receiving the command.

In another advantageous embodiment, an apparatus comprises a thrust control process and a processor unit. The thrust control process may be capable of receiving a command for a selected level of thrust generated by an engine. The thrust control process may control a level of thrust provided by the engine based on a groundspeed and an airspeed of an aircraft in response to receiving the command. The thrust control process may execute on the processor unit.

In yet another advantageous embodiment, a computer program product for controlling thrust generated by an aircraft comprises a computer recordable storage medium, and program code stored on the computer recordable storage medium. Program code may be present for receiving a command for a selected level of thrust for the aircraft. Program code may also be present for controlling a level of thrust provided by an engine for the aircraft based on a groundspeed and an airspeed of the aircraft in response to receiving the command.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
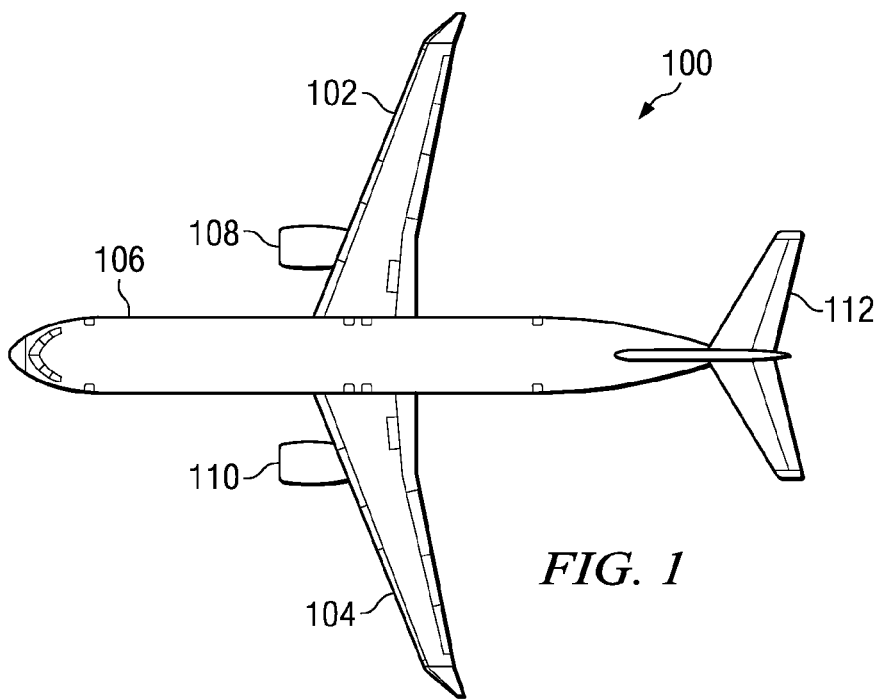
FIG. 1 is a diagram of an aircraft in which an advantageous embodiment may be implemented.

With reference now to the figures, and in particular, with reference to FIG. 1, a diagram of an aircraft is depicted in which an advantageous embodiment may be implemented. Aircraft 100 is an example of an aircraft in which a method and apparatus for controlling engine power may be implemented. In this illustrative example, aircraft 100 has wings 102 and 104 attached to body 106. Aircraft 100 includes wing mounted engine 108, wing mounted engine 110, and tail 112. In particular, the different advantageous embodiments may control a level of thrust that may be generated by wing mounted engine 108 and wing mounted engine 110 when aircraft 100 is on the ground.

Although a wing mounted twin engine aircraft is illustrated in FIG. 1, this illustration is provided for purposes of illustrating one type of aircraft in which different advantageous embodiments may be implemented. The different advantageous embodiments may be implemented on other types of aircraft with other numbers of engines and/or configurations of engines.

Figure 2:
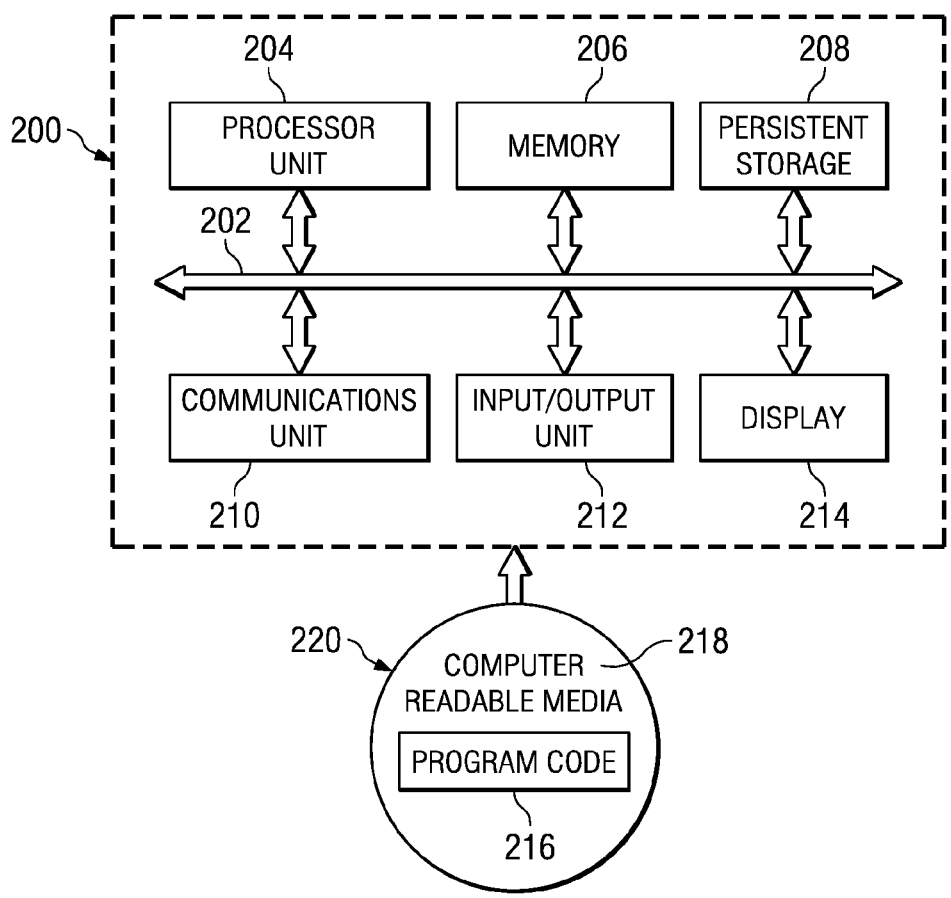
FIG. 2 is a diagram of a data processing system in accordance with an advantageous embodiment.

Turning now to FIG. 2, a diagram of a data processing system is depicted in accordance with an advantageous embodiment. Data processing system 200 is an example of a data processing that may be implemented within aircraft 100 in FIG. 1. Data processing system 200 may be found in various systems for aircraft 100. For example, data processing system 200 may be implemented in components used to control the engines.

In these different advantageous embodiments, data processing system 200 may be configured to control the thrust generated by these types of engines. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is a functional form and located on computer readable media 218 that is selectively removable and may be loaded onto or transferred to data processing system 200 for execution by processor unit 204. Program code 216 and computer readable media 218 form computer program product 220 in these examples.

In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208.

In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize and take into account that currently used systems for limiting engine power may be insufficient. The different advantageous embodiments recognize that currently used systems ramp and/or allow an increase in the maximum engine power based on airspeed.

The different advantageous embodiments recognize that using only airspeed may have a susceptibility to the thrust appearing to stop less than the target thrust until sufficient airspeed is attained. Further, the different advantageous embodiments also recognize that the use of airspeed to control the amount of thrust may allow the thrust to be reduced if a gust of wind causes a reduction in airspeed.

For example, if a pilot commands or selects full power while applying pressure on the brakes, the engines may increase thrust and hold at around 96 percent power. Once the brakes are released and the aircraft begins to roll forward, the engine power may remain at around 96 percent until the airspeed exceeds a certain threshold. This threshold may be around 30 knots. At this point, the thrust may be ramped or increased to 100 percent power using a linear ramp with increasing airspeed.

The different advantageous embodiments, recognize and take into account that situations may exist in which using airspeed to ramp thrust may not result in a linear or smooth increase in power as expected by a pilot. For example, if the aircraft begins rolling forward as the throttles are advanced such that 30 knots of airspeed is achieved before the engines have reached 96 percent power, little, if any, pause in engine power may exist.

Further, wind gusts may produce a noticeable rollback or reduction in thrust when these wind gusts reduce the airspeed of the aircraft. The different advantageous embodiments recognize and take into account that a concern may be present in which a pilot may perceive an unusual delay or rollback of the engines as an anomaly and abort a takeoff.

Thus, the different advantageous embodiments provide a method and apparatus for limiting thrust in a manner that presents a pilot with a continuously increasing thrust. This limit also ensures that a fan blade threshold is met such that undesirable vibrations that may require more frequent maintenance or sooner maintenance may be avoided. The different advantageous embodiments use a groundspeed limit and an airspeed limit to limit the amount of thrust generated by an engine. This type of system may provide a limit for the amount of thrust, but may allow for continuous thrust increase during a rolling takeoff procedure.

When a command is received for a selected level of thrust for an aircraft, the level of thrust provided by the engine may be based both on the groundspeed and the airspeed of the aircraft. A determination may be made as to whether a groundspeed limit for the thrust is to be used based on the groundspeed and the airspeed. In response to the groundspeed limit being present, the level of thrust is provided using the lower value generated between the groundspeed limit and airspeed limit.

In response to the groundspeed limit not being used, the level of thrust may be provided using the airspeed limit. At some speed of travel on the ground, the airspeed limit also may no longer be used. Further, one or more of the airspeed limit and the groundspeed limit also may be used again after this use if the requested level of thrust is less than the groundspeed limit and the groundspeed falls below some threshold.

In the different advantageous embodiments, the commanded level and the actual level of thrust is displayed to the operator. The operator may observe a lag as the thrust increases, but is less likely to mistakenly identify the lag and/or limits as an anomaly in the engine.

Figure 3:
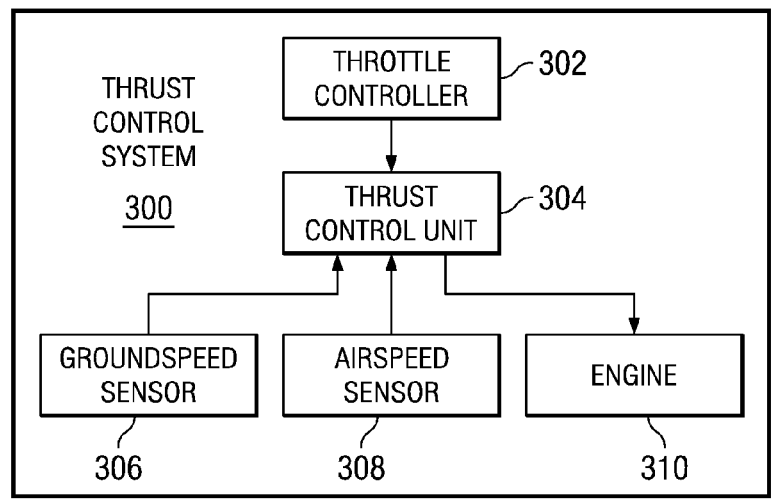
FIG. 3 is a diagram illustrating a thrust control system in accordance with an advantageous embodiment.

Turning now to FIG. 3, a diagram illustrating a thrust control system is depicted in accordance with an advantageous embodiment. Thrust control system 300 may be implemented using a data processing system such as, for example, data processing system 200 in FIG. 2.

In this example, thrust control system 300 includes throttle controller 302, thrust control unit 304, groundspeed sensor 306, airspeed sensor 308, and engine 310. Throttle controller 302 may be a controller located in a cockpit of an aircraft such as, for example, aircraft 100. Thrust control unit 304 may be a computer physically located at engine 310. Thrust control unit 304 receives input from groundspeed sensor 306 and airspeed sensor 308.

These various components illustrated for thrust control system 300 may be implemented using currently available components. For example, airspeed sensor 308 may detect airspeed based on impact pressure. For example, airspeed sensor 308 may detect a pressure difference caused by forward motion, which may be total pressure minus static pressure.

Groundspeed sensor 306 may be, for example, an inertially based sensor, a global positioning system sensor, or some other suitable type of device. The different advantageous embodiments recognize that an airspeed detected by airspeed sensor 308 may be invalid at speeds less than around 30 knots.

Figure 4:
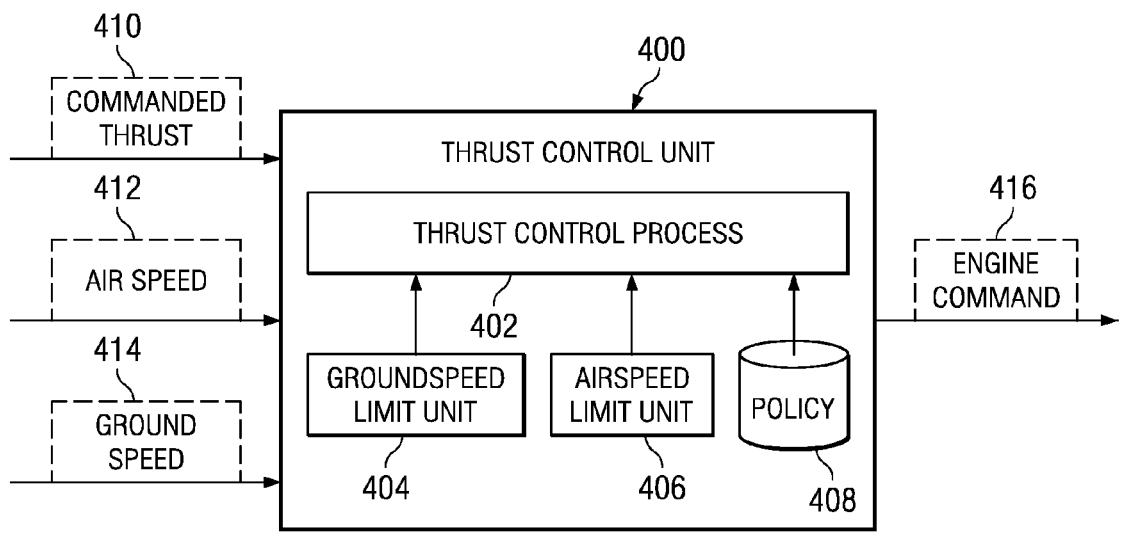
FIG. 4 is a diagram illustrating a thrust control unit in accordance with an advantageous embodiment.

With reference now to FIG. 4, a diagram illustrating a thrust control unit is depicted in accordance with an advantageous embodiment. In this example, thrust control unit 400 is a more detailed example of thrust control unit 304 in FIG. 3.

In this example, thrust control unit 400 includes thrust control process 402, groundspeed limit unit 404, airspeed limit unit 406, and policy 408. Thrust control process 402 may receive commanded thrust 410 as an input. Commanded thrust 410 may be received from a controller such as, for example, throttle controller 302 in FIG. 3.

Commanded thrust 410 is a command indicating the level of thrust desired by a pilot. Thrust control process 402 also may receive airspeed 412 and groundspeed 414 as inputs when generating engine command 416. Engine command 416 is the command actually sent to the engine by thrust control unit 400 and may vary from commanded thrust 410, depending on the application of policy 408.

Policy 408 is a set of rules. A set as used herein refers to one or more items. For example, a set of rules is one or more rules. Policy 408 may be used by thrust control process 402 to determine whether groundspeed limit unit 404 and/or airspeed limit unit 406 should be used to provide limits when generating engine command 416. If neither groundspeed limit 404 nor airspeed limit 406 limit is applied, engine command 416 may be the same as commanded thrust 410. Groundspeed limit unit 404 and airspeed limit unit 406 are functions that may be used to limit the amount of thrust in engine command 416.

The limits generated by these units may be used to limit the amount of thrust requested in commanded thrust 410. In other words, groundspeed limit unit 404 and/or airspeed limit unit 406 may generate limits for the level of thrust for engine command 416. With the limits that may be generated by groundspeed limit unit 404 and/or airspeed limit unit 406, engine command 416 may provide a level of thrust that is less than commanded thrust 410 depending on the speed of aircraft.

In these examples, groundspeed limit unit 404 applies when the groundspeed of the aircraft is less than some limit.

Groundspeed limit unit 404 may be disabled when the groundspeed or the airspeed exceeds some threshold. The threshold for the groundspeed and airspeed are different in these examples. The groundspeed threshold for disabling groundspeed limit unit 404 may be higher than the airspeed threshold in these examples.

Groundspeed limit unit 404 is implemented as a ramp function using groundspeed 414. In this manner, the thrust may increase continuously from a lower limit up to an upper limit. This upper limit in these examples is an airspeed thrust limit. This airspeed thrust limit may be set at a level to prevent undesirable vibrations in the fan blades that may occur due to changes in aerodynamics caused by crosswinds. In these illustrative examples, groundspeed limit unit 404 may be implemented in a number of different ways. For example, groundspeed limit unit 404 may be implemented as a table, a series of equations, or some other suitable function.

For example, groundspeed limit unit 404 may provide for a groundspeed using the following equation:

$$\text{maximum thrust}=((6/55)*\text{groundspeed})+90.$$

Alternatively, a table may set the limit for the thrust based on the groundspeed.

Airspeed limit unit 406 is an upper limit to the thrust that may be commanded. This limit also may be disabled when the airspeed is above a selected level. In these examples, airspeed limit unit 406 may be implemented using logical hysteresis or any other suitable function or process. For example, the limit may switch off when airspeed increases from some airspeed to another airspeed.

Further, the limit may be switched on or used when the airspeed decreases from a higher airspeed to a lesser airspeed. For example, the limit may be 96 percent of the maximum thrust when the airspeed is less than 50 knots. When the airspeed becomes greater than 50 knots, the limit is then the maximum thrust. The limit may be turned back on if the airspeed decreases from a level that is greater than 35 knots to less than 35 knots. When that occurs, the limit may be set to 96 percent of the maximum thrust rather than providing maximum thrust.

Figure 5:
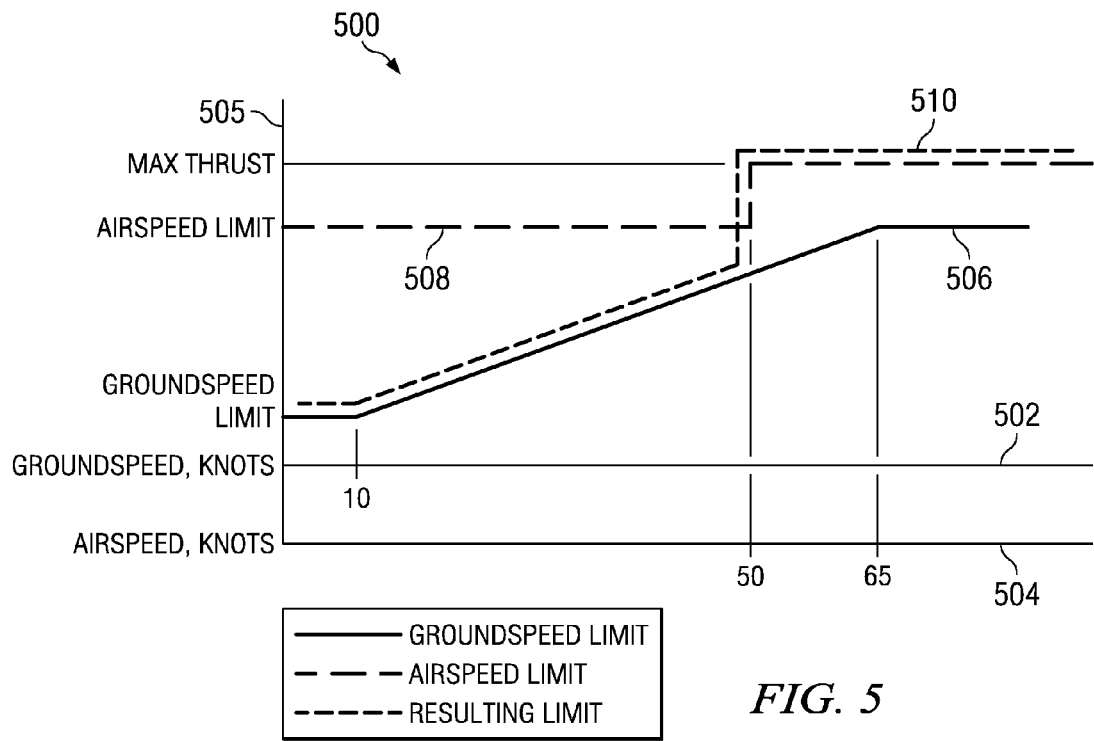
FIG. 5 is a diagram illustrating limits supplied to engine thrust in accordance with an advantageous embodiment.

With reference now to FIG. 5, a diagram illustrating limits supplied to engine thrust is depicted in accordance with an advantageous embodiment. In this example, graph 500 illustrates groundspeed on horizontal axis 502 and airspeed on horizontal axis 504. The thrust is a percentage of maximum thrust. Thrust in percent is represented by vertical axis 505. Line 506 illustrates a groundspeed limit, while line 508 illustrates an airspeed limit. Line 510 illustrates a resulting limit from these two limits. The resulting limit in line 510 may change depending on whether wind is present.

In this example, no wind is present. The groundspeed limit represented by line 506 is level until 10 knots groundspeed is reached. The amount of thrust that may be generated increases as a ramp until 65 knots is reached. At 65 knots, the thrust limit is level. The airspeed limit represented by line 508 is level until an airspeed of 50 knots is reached. At that point, the airspeed limit is removed and the maximum thrust may be generated. As can be seen by this example, the groundspeed limit is removed when the airspeed reaches 50 knots.

Figure 6:
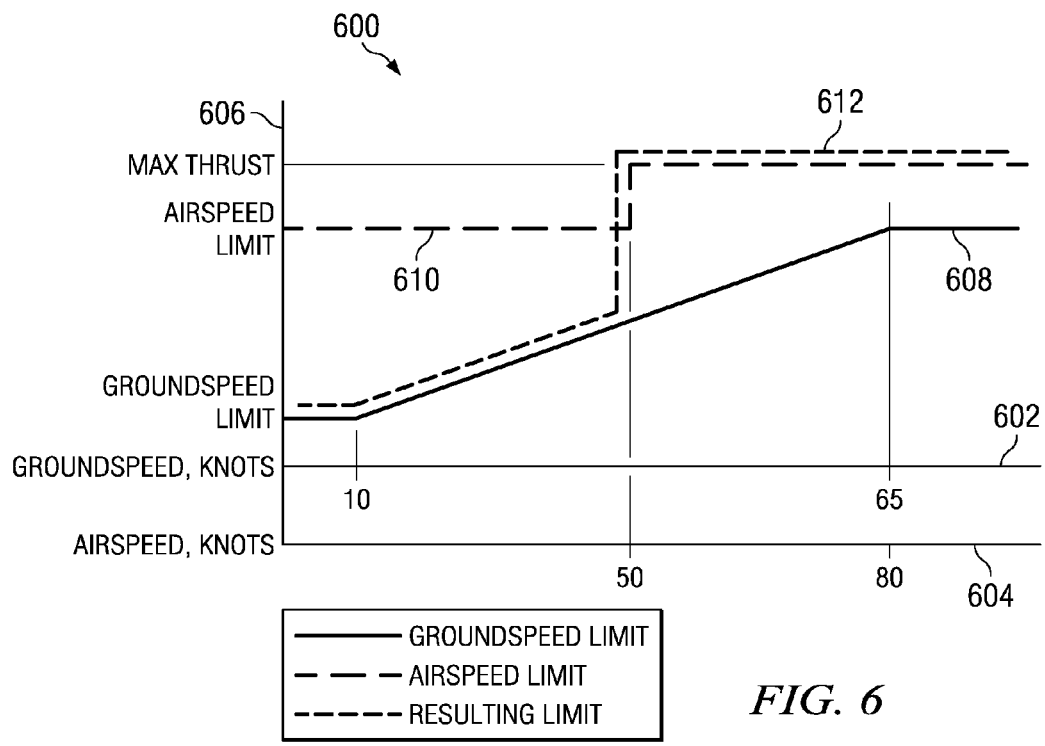
FIG. 6 is a diagram illustrating limits for thrust in accordance with an advantageous embodiment.

With reference now to FIG. 6, a diagram illustrating limits for thrust is depicted in accordance with an advantageous embodiment. In this example, graph 600, horizontal axis 602 represents groundspeed, while horizontal axis 604 represents airspeed. Vertical axis 606 represents thrust. Line 608 represents a groundspeed limit, while line 610 represents an airspeed limit. Line 612 represents a resulting limit from these two limits.

In this example, a 15 knot headwind is encountered by the aircraft. As can be seen, an airspeed of 50 knots is reached more quickly as compared to graph 500 with the presence of a headwind. When 50 knots is reached, the groundspeed limit is no longer effective. Further, the airspeed limit is also removed resulting in power being increased to a maximum thrust for the engine.

Figure 7:
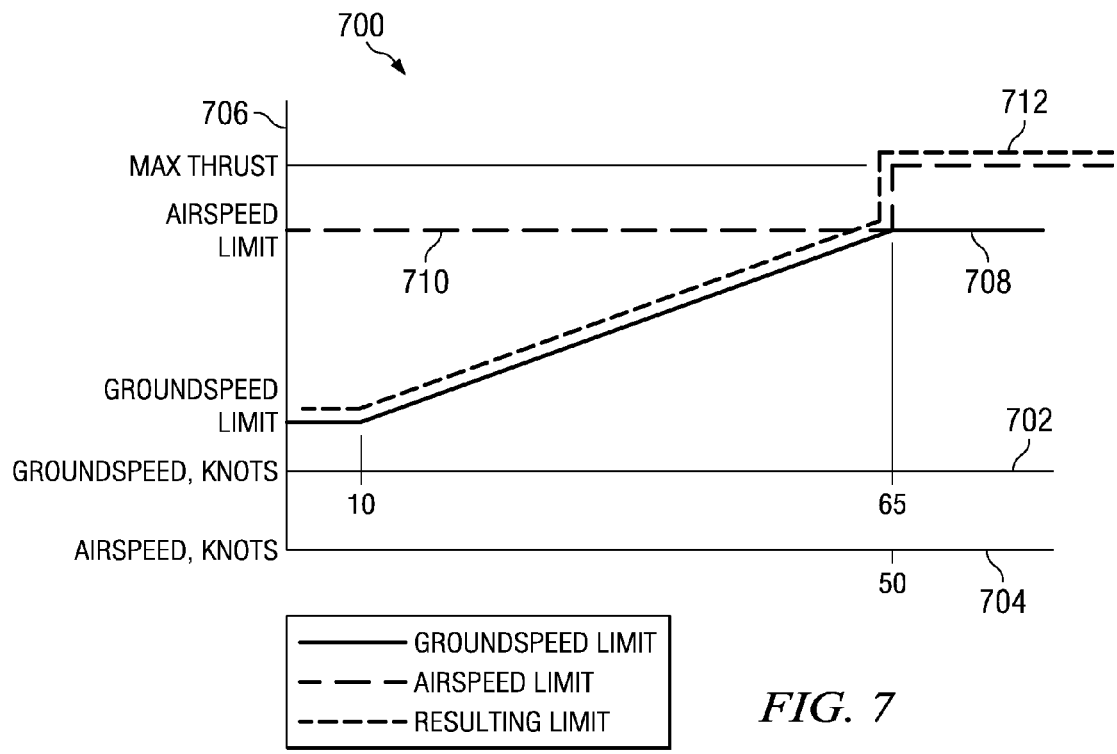
FIG. 7 is a diagram illustrating limits for thrust in accordance with an advantageous embodiment.

With reference now to FIG. 7, a diagram illustrating limits for thrust is depicted in accordance with an advantageous embodiment. In graph 700, horizontal axis 702 represents groundspeed, while horizontal axis 704 represents airspeed. Vertical axis 706 represents thrust. Line 708 represents a groundspeed limit, while line 710 represents an airspeed limit. Line 712 illustrates the resulting limit between the airspeed limit and the groundspeed limit.

In this example, a 15 knot tailwind is present. As a result, an airspeed of 50 knots is not reached until the groundspeed of 65 knots also is reached. As a result, the limit is not removed until the groundspeed has reached 65 knots in this example.

Figure 8:
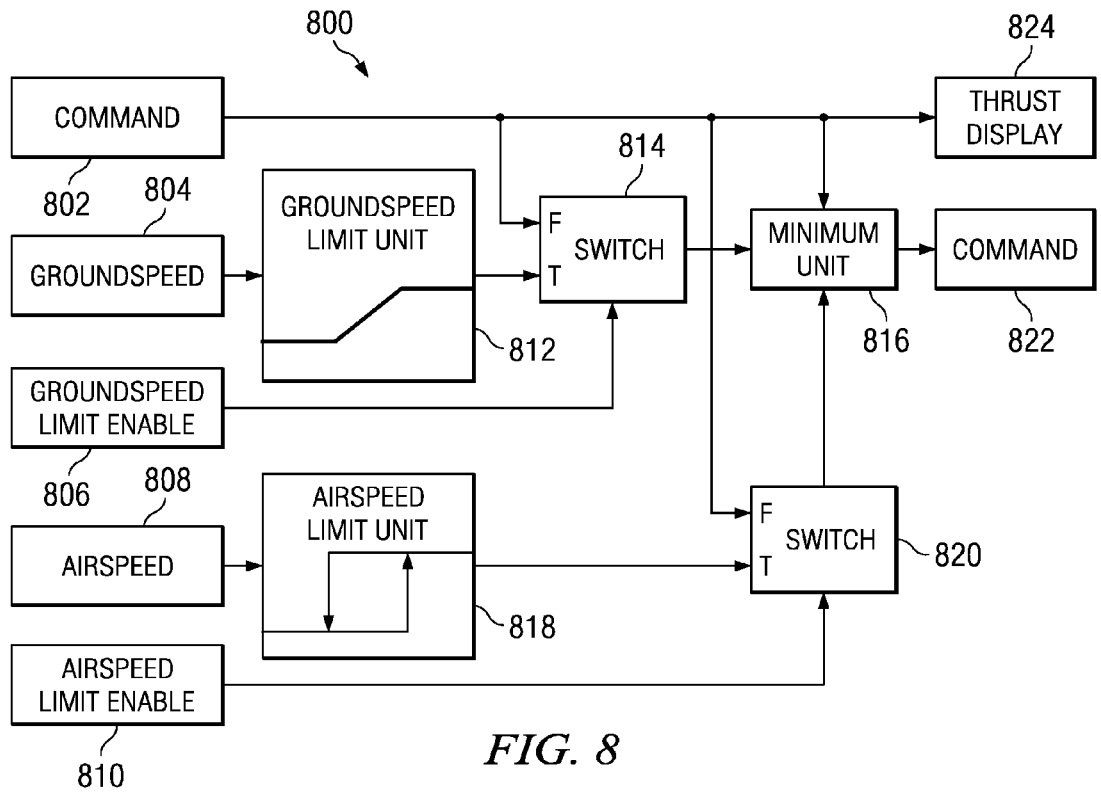
FIG. 8 is a diagram illustrating logic for controlling thrust in accordance with an advantageous embodiment.
Figure 9:
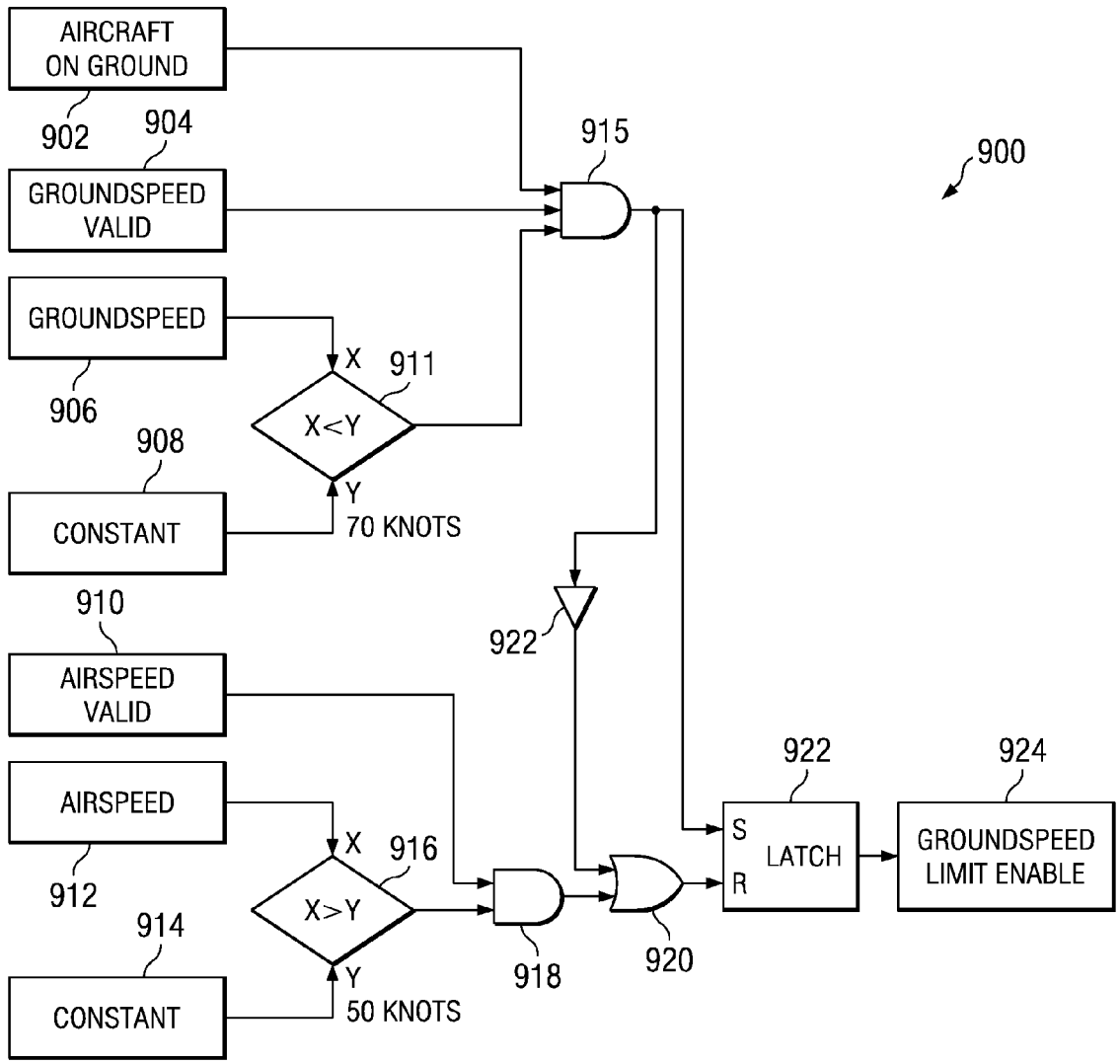
FIG. 9 is a diagram illustrating logic to generate or enable a groundspeed limit enable signal in accordance with an advantageous embodiment.
Figure 10:
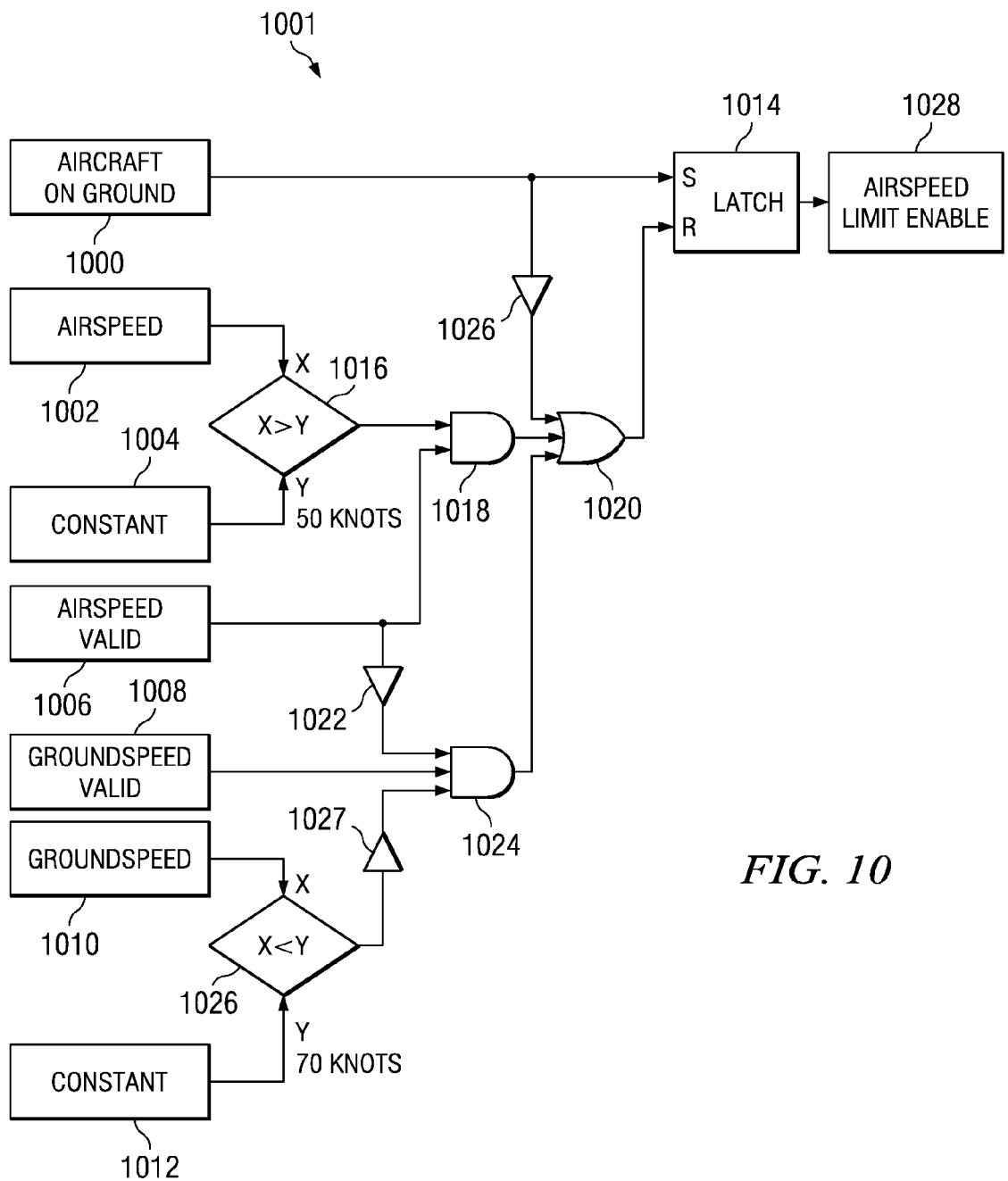
FIG. 10 is a diagram illustrating logic to generate an airspeed limit enable signal in accordance with an advantageous embodiment.

With reference to FIGS. 8-10, an example of logic for a thrust control process is depicted in accordance with an advantageous embodiment. The logic illustrated in FIGS. 8-10 are simplified diagrams of logic that may be used.

These simplified diagrams are presented for purposes of illustrating logic on a high level for use in a thrust control process, such as thrust control process 402. The actual logic used to implement these processes may include other logic components in addition to or in place of the ones depicted in these figures.

With reference now to FIG. 8, a diagram illustrating logic for controlling thrust is depicted in accordance with an advantageous embodiment. Logic 800 in FIG. 8 is an example of logic that may be implemented in thrust control process 402 in FIG. 4.

In this example, logic 800 receives command 802 as an input. Logic 800 also receives groundspeed 804, groundspeed limit enable 806, airspeed 808, and airspeed limit enable 810 as inputs.

Groundspeed 804 is sent to groundspeed limit unit 812. The output of groundspeed limit unit 812 is a groundspeed limit for a thrust level that is based on groundspeed 804. The output of groundspeed limit unit 812 may be a thrust level that is less than that in command 802. When groundspeed limit enable is a logic "1", groundspeed limit unit 812 is used to control thrust. This thrust level is input into switch 814. Switch 814 may be enabled by groundspeed limit enable 806. Additionally, command 802 also is input into switch 814. The output of switch 814 is sent into minimum unit 816.

Airspeed 808 is entered as an input into airspeed limit unit 818. Airspeed limit unit 818 generates an airspeed limit for a thrust level based on airspeed 808. The output of airspeed limit unit 818 may be a thrust level that is less than the amount of thrust requested by command 802. This thrust level is sent to switch 820. Switch 820 also receives command 802 as an input. Switch 820 may be enabled by airspeed limit enable 810. When airspeed limit enable is a logic "1", airspeed limit unit 818 is used to control thrust. The output of switch 820 is sent to minimum unit 816.

Minimum unit 816 selects the lower value of the outputs of switch 814 and switch 820. In these examples, groundspeed limit unit 812 is typically a lower limit than airspeed limit unit 818. Then this output forms command 822 which is used to control the engine.

In these examples, command 802 also forms thrust display 824 which is an output for the display that is seen by the pilot. In the different advantageous embodiments, although command 822 may be lower than command 802, the pilot sees the same level of commanded thrust in command display 824 as command 802. The pilot may perceive a lag in the thrust increasing as the airspeed increases. This increase in thrust, however, may be maintained as a constant increase to avoid aborting a takeoff when an engine anomaly is not actually present.

With reference now to FIG. 9, a diagram illustrating logic to enable a groundspeed limit is depicted in accordance with an advantageous embodiment. In this example, logic 900 receives a number of different inputs. These inputs include aircraft on ground 902, groundspeed valid 904, groundspeed 906, constant 908, airspeed valid 910, airspeed 912, and constant 914.

In this example, aircraft on ground 902 indicates whether the aircraft is on the ground. A logic "1" indicates that the aircraft is on the ground in these examples. Groundspeed valid 904 is a logic "1" if the groundspeed is valid. Groundspeed 906 is the groundspeed detected by a groundspeed sensor. A groundspeed may not be valid if, for example, a groundspeed sensor is disabled or faulty. Constant 908 in this example is a speed limit at which the groundspeed limit should be enabled. In this example, constant 908 is 70 knots.

Groundspeed 906 and constant 908 are compared by comparator 911. Comparator 911 determines whether groundspeed 906 is less than constant 908. If groundspeed 906 is less than constant 908, a true value is generated by comparator 911 and sent into AND gate 915. If groundspeed 906 is not less than constant 908, a false value is generated by comparator 911 and sent into AND gate 915. AND gate 915 also receives groundspeed valid 904 and aircraft on ground 902 as inputs. The output of AND gate 915 is true if all of the inputs are true.

Airspeed 912 and constant 914 are sent into comparator 916. In these examples, if airspeed 912 is greater than constant 914, the output of comparator 916 is the logic "1." This output is sent into AND gate 918. AND gate 918 also receives airspeed valid 910 as an input. If the airspeed is valid and airspeed 912 is greater than constant 914, a logic "1" is output by AND gate 918. This output is sent into OR gate 920. Additionally, the output of AND gate 915 is sent through inverter 922 into OR gate 920. The output of OR gate 920 is sent into latch 922.

Latch 922 also receives the output of AND gate 915 as an input. When the output of AND gate 915 is true, the output of latch 922 is set true, and remains true until the output of OR gate 920 is true. As long as the output of OR gate 920 is true, the output of latch 922 is false. The output of latch 922 forms groundspeed limit enable 924, which is used in logic 800. More specifically, groundspeed limit enable 924 is an example of groundspeed limit enable 806 in FIG. 8.

In essence, groundspeed logic 900 determines whether the groundspeed limit is to be used. In these examples, logic 900 enables the groundspeed limit when the groundspeed is valid, the groundspeed is less than 70 knots, and the aircraft is on the ground.

Once logic 900 enables the groundspeed limit, this limit may be disabled if the groundspeed becomes invalid, the groundspeed exceeds 70 knots, the aircraft is in the air, or the airspeed is valid and the airspeed is greater than 50 knots. If the groundspeed limit has been disabled with speed that is above a selected level, or if the groundspeed is invalid, the groundspeed limit may be re-enabled. In this example, the disabling speed may be an airspeed of 50 knots and/or a groundspeed of 70 knots.

The groundspeed may be re-enabled if the commanded or requested thrust is less than the groundspeed limit for the current groundspeed, the groundspeed is valid, and the groundspeed falls below 20 knots.

With reference now to FIG. 10, a diagram illustrating logic to generate an airspeed limit enable signal is depicted in accordance with an advantageous embodiment. In this example, logic 1001 receives a number of different inputs. These inputs include, for example, aircraft on ground 1000, airspeed 1002, constant 1004, airspeed valid 1006, groundspeed valid 1008, groundspeed 1010, and constant 1012.

In this example, aircraft on ground 1000 is sent into latch 1014. Airspeed 1002 and constant 1004 are sent to comparator 1016. In this example, constant 1004 is 50 knots. If airspeed 1002 is greater than constant 1004, a logic "1" is sent into AND gate 1018. AND gate 1018 also receives airspeed valid 1006 as an input. The output of AND gate 1018 is sent into OR gate 1020. Airspeed valid 1006 is sent through inverter 1022 to the input of AND gate 1024. Groundspeed valid 1008 also forms an input into AND gate 1024.

Groundspeed 1010 and constant 1012 are sent to comparator 1026. In these examples, comparator 1026 determines whether groundspeed 1010 is less than constant 1012. The output of comparator 1026 is sent through inverter 1027 to AND gate 1024. The output of AND gate 1024 is sent to OR gate 1020.

Aircraft on ground 1000 is also an input into OR gate 1020. Aircraft on ground 1000 is sent through inverter 1026 into OR gate 1020. If groundspeed 1010 is less than constant 1012, the output of comparator 1026 is a logic "1" in these examples. Constant 1012 has a value of 70 knots in this example.

The output of OR gate 1020 is sent as an input into latch 1014. The output of latch 1014 is set true when the aircraft is on the ground. When any of the input conditions cause the output of OR gate 1020 to be true, the output of latch 1014 is held false. The output of latch 1014 forms airspeed limit enable 1028. This value is an input into logic 800 in FIG. 8. Airspeed limit enable 1028 is an example of groundspeed limit enable 806 in FIG. 8.

In this example, logic 1001 disables the airspeed limit when the airspeed is greater than 50 knots. The airspeed limit may be re-enabled in these examples, if the airspeed is less than 35 knots or if the airspeed is invalid and the groundspeed is valid and less than 20 knots, and if the commanded level thrust is less than the airspeed limit.

The logic illustrated in FIGS. 8-10 are provided as an example of one manner in which groundspeed and airspeed may be used to control thrust during takeoff. This example is not meant to imply physical or architectural limitations to the manner in which other advantageous embodiments may be implemented.

Figure 11:
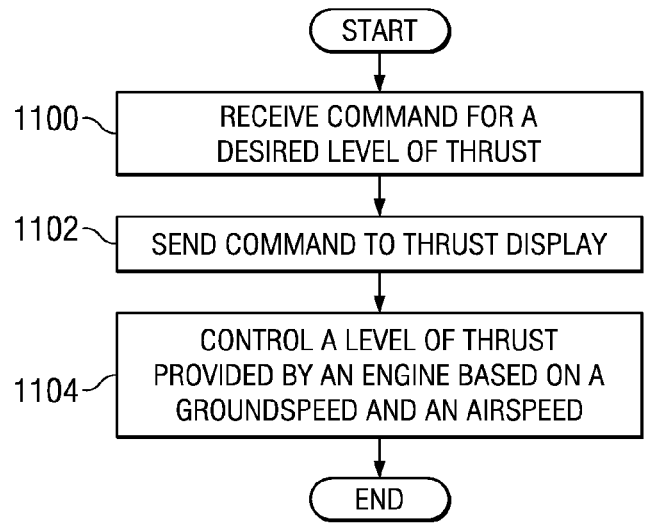
FIG. 11 is a high level flowchart of a process for controlling thrust generated by an aircraft in accordance with an advantageous embodiment.

With reference now to FIG. 11, a high level flowchart of a process for controlling thrust generated by an aircraft is depicted in accordance with an advantageous embodiment. The process illustrated in FIG. 11 may be implemented in thrust control process 402 in FIG. 4.

The process begins by receiving a command for a desired level of thrust for an aircraft on the ground (operation 1100). The process sends the command to a thrust display (operation 1102). The thrust display in operation 1102 may be, for example, thrust display 312 in FIG. 3.

The process controls a level of thrust actually provided by an engine in the aircraft based on a groundspeed and an airspeed (operation 1104), with the process terminating thereafter. Operation 1104 uses a lower limit of thrust set by a ground speed limit and an airspeed limit to control the level of thrust of the engine for the aircraft.

The level of thrust provided is based on the desired level of thrust and the lower limit, wherein the level of thrust is a continuous linear increase in thrust limited by the groundspeed limit and the airspeed limit. In other words, the level of thrust does not exceed the lower of the two limits as long as the limits are enabled or being used in the manner described in these examples.

Figure 12:
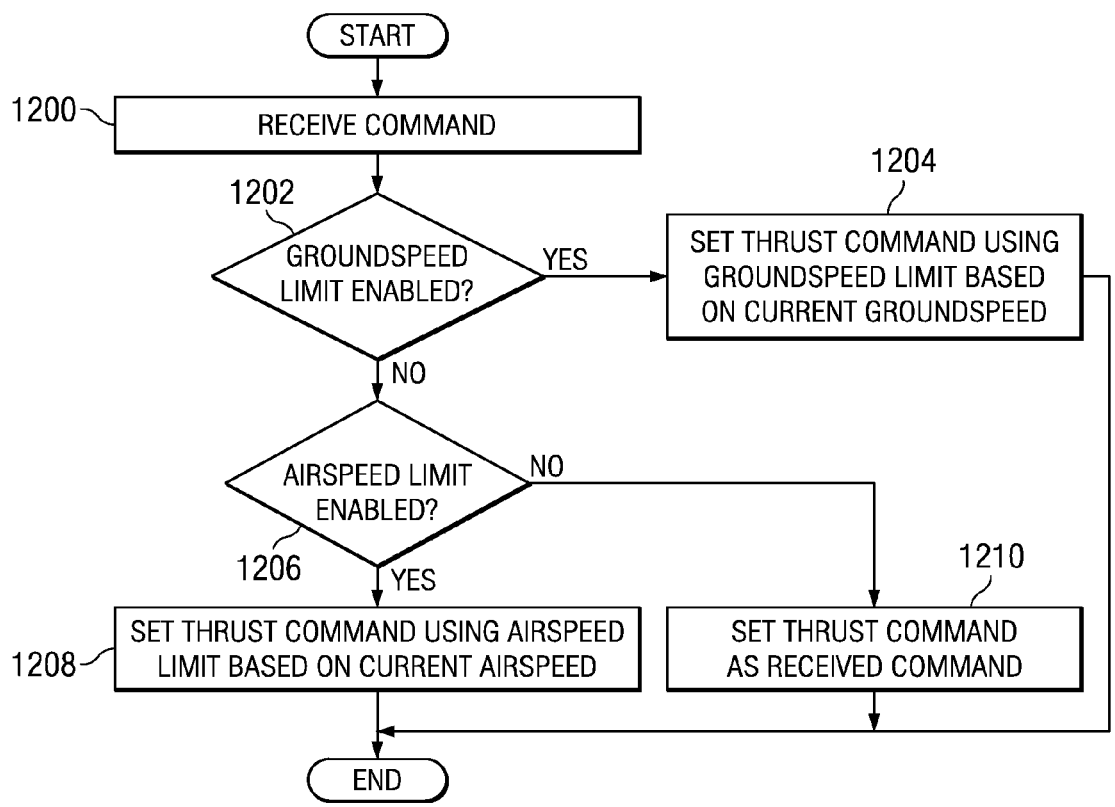
FIG. 12 is a flowchart of a process for controlling thrust generated by an aircraft in accordance with an advantageous embodiment.

With reference now to FIG. 12, a flowchart of a process for controlling thrust generated by an aircraft is depicted in accordance with an advantageous embodiment. The process illustrated in FIG. 12 may be implemented in a software component such as, for example, thrust control process 402 in FIG. 4. More specifically, FIG. 12 is a more detailed illustration of the process in FIG. 11.

The process begins by receiving a command for a selected level of thrust for the aircraft (operation 1200). A determination is made as to whether a groundspeed limit has been enabled (operation 1202). If the groundspeed limit has been enabled, the thrust command is set using the groundspeed limit based on the current groundspeed (operation 1204), with the process terminating thereafter.

With reference again to step 1202, if the groundspeed limit is not enabled, a determination is made as to whether an airspeed limit has been enabled (operation 1206). If the airspeed limit has been enabled, the thrust command is set using the airspeed limit based on the current airspeed (operation 1208), with the process terminating thereafter.

With reference again to operation 1206, if the airspeed limit is not enabled, the process sets the thrust command as the received command (operation 1210), with the process terminating thereafter. In this case, the commanded thrust is the actual level of thrust that is sent as a thrust command to the engine. In operation 1210, no limits are applied to the actual thrust since the groundspeed limit and the airspeed limit are not enabled.

Figure 13:
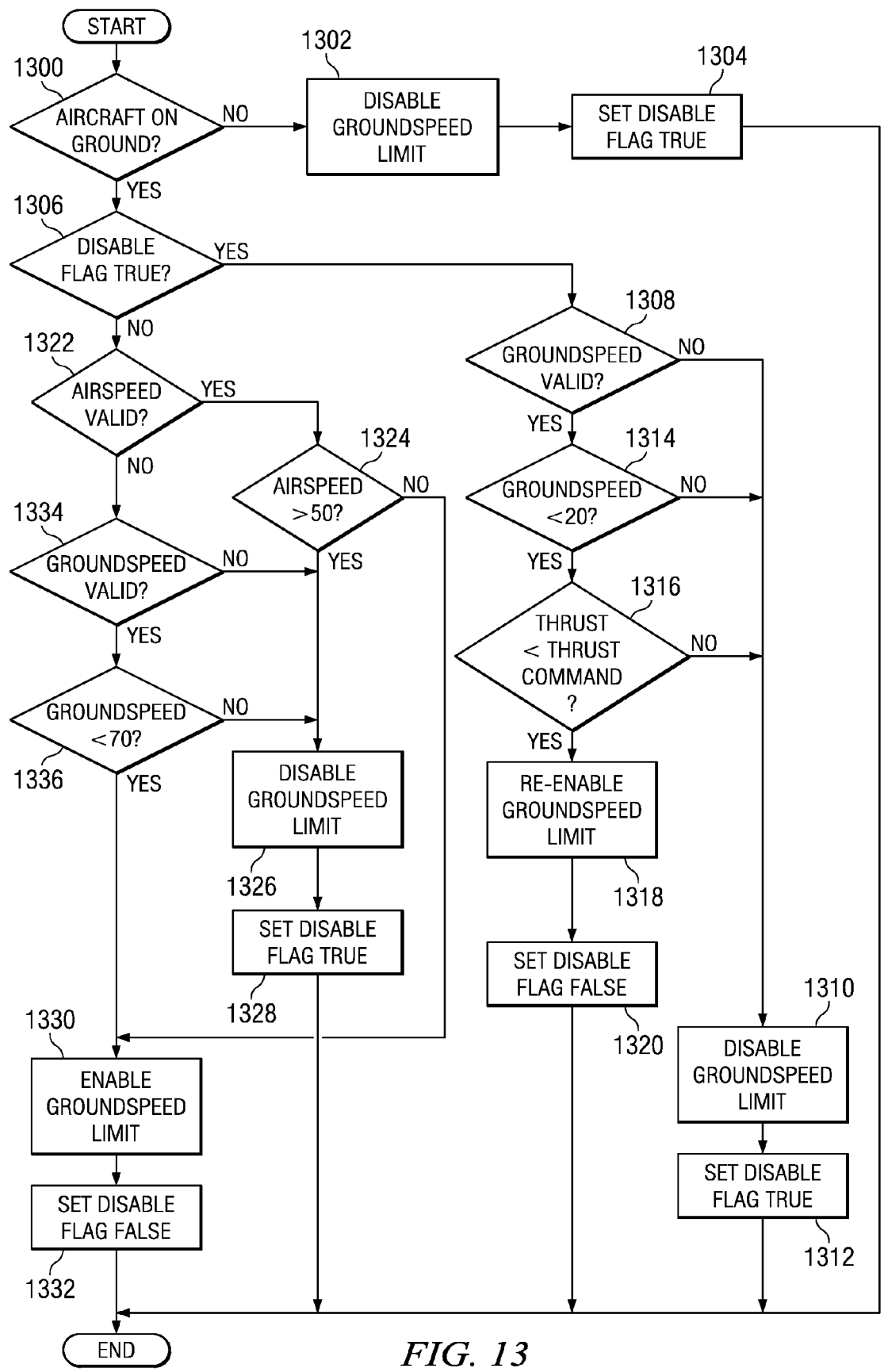
FIG. 13 is a flowchart of a process for enabling and disabling a groundspeed limit in accordance with an advantageous embodiment.

With reference now to FIG. 13, a flowchart of a process for enabling and disabling a groundspeed limit is depicted in accordance with an advantageous embodiment. The process illustrated in FIG. 13 may be implemented in a software component such as, for example, thrust control process 402 in FIG. 4.

The process begins by determining whether the aircraft is on the ground (operation 1300). If the aircraft is not on the ground, the process disables the groundspeed limit (operation 1302). Next, the disable flag is set as true (operation 1304), with the process terminating thereafter.

With reference again to operation 1300, if the aircraft is on the ground, a determination is made as to whether the disable flag is set equal to true (operation 1306). This determination is made to identify whether the groundspeed limit has been previously disabled, but may need to be re-enabled, for example if the aircraft has left the ground but returned to the ground.

If the disable flag is set equal to true, a determination is made as to whether the groundspeed is valid (operation 1308). If the groundspeed is not valid, the groundspeed limit is disabled (operation 1310) and the process sets the disable flag equal to true (operation 1312), with the process terminating thereafter.

With reference again to operation 1308, if the groundspeed is valid, a determination is made as to whether the groundspeed is less than 20 knots (operation 1314). The threshold value of 20 knots is set at a speed that indicates that the aircraft is no longer taking off. In this case, the aircraft either was taking off and aborted the take off or took off and subsequently landed.

If the groundspeed is not less than 20 knots, the process proceeds to operation 1310 as described above. Otherwise, a determination is made as to whether the thrust is less than the thrust command (operation 1316). In this example, the thrust command is the command or desired thrust requested by pilot.

If the thrust is not less than the thrust command, the process proceeds to operation 1310 as previously described. Otherwise, the process re-enables the groundspeed limit (operation 1318). The process then sets the disable flag to false (operation 1320), with the process terminating thereafter.

With reference again to operation 1306, if the disable flag is not true, a determination is made as to whether the airspeed is valid (operation 1322). If the airspeed is valid, a determination is made as to whether the airspeed is greater than 50 knots (operation 1324). If the airspeed is greater than 50 knots, the groundspeed limit is disabled (operation 1326). The process then sets the disable flag equal to true (operation 1328), with the process terminating thereafter.

With reference again to operation 1324, if the airspeed is not greater than 50 knots, the groundspeed limit is enabled (operation 1330). The process then sets the disable flag equal to false (operation 1332), with the process terminating thereafter.

With reference again to operation 1322, if the airspeed is not valid, a determination is made as to whether the groundspeed is valid (operation 1334). If the groundspeed is not valid, the process proceeds to operation 1326 as described above. If the groundspeed is valid, a determination is made as to whether the groundspeed is less than 70 knots (operation 1336).

In this example, the 70 knot groundspeed level provides a 20 knot margin above the airspeed limit of 50 knots. This margin allows for continuous engine acceleration for a takeoff in a 15-knot tailwind, as illustrated in FIG. 7, and provides an additional 5 knot margin to account for uncertainty in the groundspeed sensing system. Of course, other thresholds may be selected depending on the implementation. If the groundspeed is not less than 70 knots, the process proceeds to operation 1326. Otherwise, the process proceeds to operation 1330 as described above.

Figure 14:
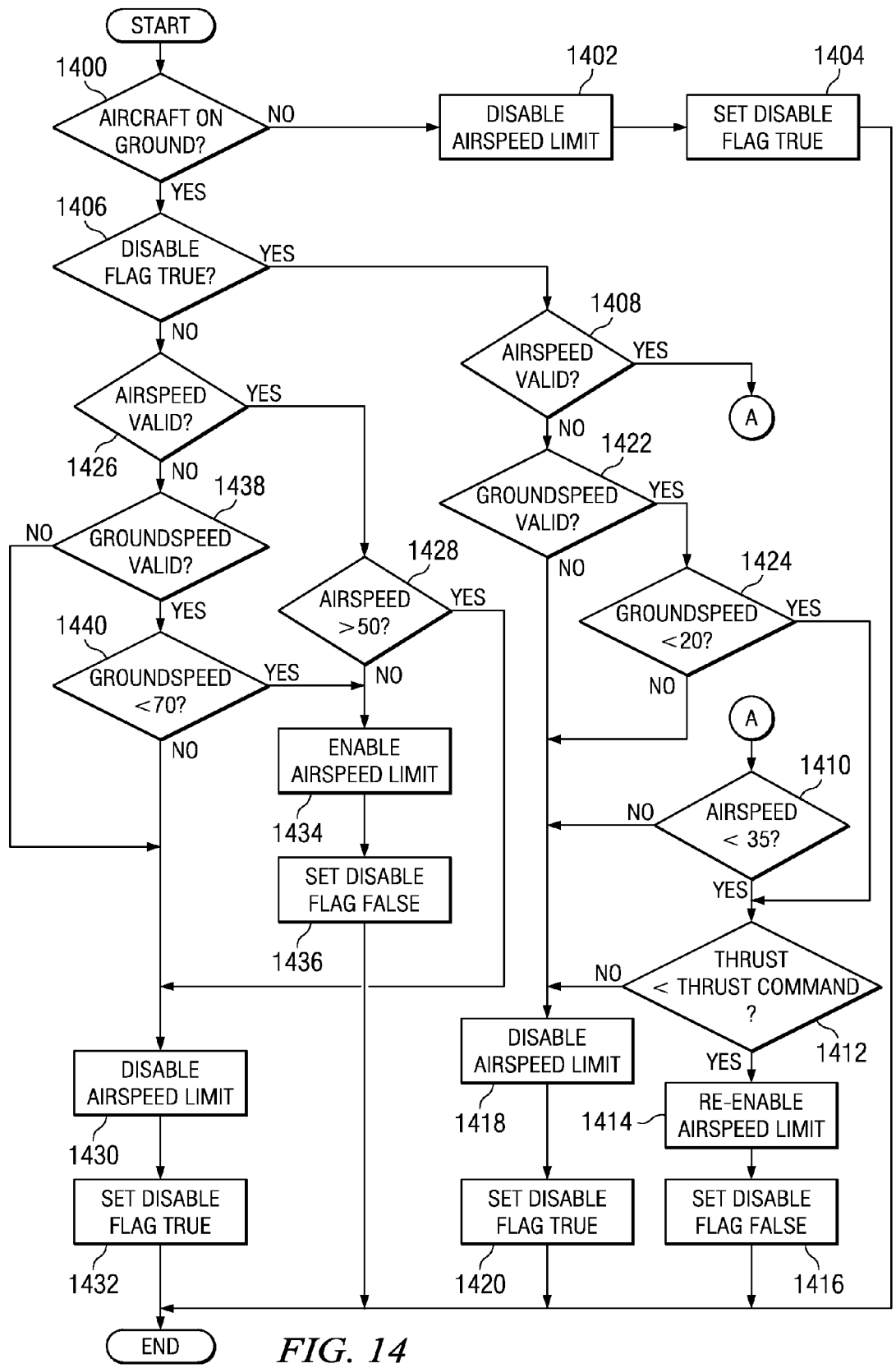
FIG. 14 is a flowchart of a process for enabling and disabling an airspeed limit in accordance with an advantageous embodiment.

With reference now to FIG. 14, a flowchart of a process for enabling and disabling an airspeed limit is depicted in accordance with an advantageous embodiment. The process illustrated in FIG. 14 may be implemented in a software component such as, for example, thrust control process 402 in FIG. 4.

The process begins by determining whether the aircraft is on the ground (operation 1400). If the aircraft is not on the ground, the process disables the airspeed limit (operation 1402). The process then sets the disable flag equal to true (operation 1404), with the process terminating thereafter.

With reference again to operation 1400, if the aircraft is on the ground, a determination is made as to whether the disable flag is set equal to true (operation 1406). If the disable flag is true, a determination is made as to whether the airspeed is valid (operation 1408). If the airspeed is valid, a determination is made as to whether the airspeed is less than 35 knots (operation 1410). If the airspeed is less than 35 knots, a determination is made as to whether the thrust is less than the thrust command (operation 1412). If the thrust is less than the thrust command, the process re-enables the airspeed limit (operation 1414) and sets the disable flag to false (operation 1416), with the process terminating thereafter.

In operation 1412, if the thrust is not less than the thrust command, the process disables the airspeed limit (operation 1418) and sets the disable flag equal to true (operation 1420). With reference again to operation 1410, if the airspeed is not less than 35 knots, the process also proceeds to operation 1418.

In operation 1408, if the airspeed is not valid, a determination is made as to whether the groundspeed is valid (operation 1422). If the groundspeed is valid, a determination is made as to whether the groundspeed is less than 20 knots. If the groundspeed is less than 20 knots, the process proceeds to operation 1412 as described above. Otherwise, the process proceeds to operation 1418 as previously described. In operation 1422, the process proceeds to operation 1418 if the groundspeed is not valid.

With reference again to operation 1406, if the disable flag is not true, a determination is made as to whether the airspeed is valid (operation 1426). If the airspeed is valid, a determination is made as to whether the airspeed is greater than 50 knots (operation 1428). If the airspeed is greater than 50 knots, the process disables the airspeed limit (operation 1430). The process then sets the disable flag equal to true (operation 1432), with the process terminating thereafter. As an example, the threshold of 50 knots may be the airspeed at which inlet separation due to crosswinds has been eliminated, and full thrust is allowed.

If the airspeed is not greater than 50, the process enables the airspeed limit (operation 1434). The process then sets the disable flag to false (operation 1436), with the process terminating thereafter.

With reference again to operation 1426, if the airspeed is not valid, a determination is made as to whether the groundspeed is valid (operation 1438). If the groundspeed is valid, a determination is made as to whether the groundspeed is less than 70 knots (operation 1440). If the groundspeed is less than 70 knots, the process proceeds to operation 1434 as described above. The 70 knot groundspeed limit is selected to provide a margin above the 50 knot airspeed limit. Otherwise, the process proceeds to operation 1430 as previously described. The process also proceeds to operation 1430 in operation 1438 if the groundspeed is not valid.

The different thresholds illustrated in FIGS. 13 and 14 have been selected for purposes of depicting one implementation and are not meant to limit the manner in which other advantageous embodiments may be implemented. For example, in other advantageous embodiments, other groundspeed thresholds may be used other than those illustrated.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method, apparatus, and program code for managing thrust levels in an aircraft. The different advantageous embodiments receive a command for a selected amount of thrust. The actual amount of thrust generated by the engine may be controlled based on the groundspeed and airspeed of the aircraft. In these different advantageous embodiments, an airspeed limit and a groundspeed limit may be applied to the received command to identify the actual command to be sent to the engine to generate thrust.

Using the different advantageous embodiments, an operator of the aircraft perceives a constant increase in thrust without reaching speed limits that may produce additional wear and tear on the engine. In particular, undesired vibrations on fan blades in the engine may be avoided to reduce the frequency of maintenance for these and other components.

The operator may only perceive a lag in engine thrust. As a result, the operator may not mistakenly perceive an anomaly in the engine requiring aborting the takeoff.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for controlling thrust generated by an engine for an aircraft, the method comprising:
   receiving, in a thrust control unit, a command for a selected thrust mode for the aircraft, wherein the selected thrust mode comprises at least one of: takeoff thrust, and maximum thrust;
   responsive to receiving the command, controlling a level of thrust provided by the engine for the aircraft based on factors comprising: a determination of an undesired engine parameter before the undesired engine parameter occurs, a groundspeed of the aircraft, and an airspeed of the aircraft, wherein the undesired engine parameter comprises at least one of: an engine fan blade threshold, and an engine speed limit, wherein the controlling step comprises:
   providing the level of thrust as a lower level of thrust set by a groundspeed limit, and an airspeed limit;
   determining whether a current groundspeed exceeds a first threshold;
   determining whether a current airspeed exceeds a second threshold;
   responsive to the current groundspeed exceeding the first threshold, disabling the groundspeed limit from being used to control the level of thrust; and
   responsive to the current airspeed exceeding the second threshold, disabling the groundspeed limit from being used to control the level of thrust.

2. The method of claim 1, wherein the controlling step comprises:
   responsive to receiving the command for the selected level of thrust, using a lower limit of the thrust set by a groundspeed limit and an airspeed limit to control the level of thrust of the engine for the aircraft; and
   providing the level of thrust based on the selected thrust mode and the lower limit of the thrust, wherein the level of thrust is a continuous increase in the thrust limited by the groundspeed limit and the airspeed limit.

3. The method of claim 1, wherein the groundspeed limit and the airspeed limit avoid thrust levels that increase engine fan blade vibrations above a desired level.

4. The method of claim 1, wherein the controlling step comprises:
   responsive to using the groundspeed limit for the thrust, providing an upper thrust limit to continuously increase the level of thrust to, as a ramp function based on the groundspeed.

5. The method of claim 4, wherein the controlling step further comprises:
   disabling the groundspeed limit from being used to control the level of thrust if the groundspeed is invalid.

6. The method of claim 1, wherein the controlling step further comprises:
   responsive to disabling the groundspeed limit above a selected speed, re-enabling the groundspeed limit for use in controlling the level of thrust if the command for a selected thrust mode is less than the groundspeed limit and the groundspeed falls below a selected groundspeed.

7. The method of claim 1, wherein the controlling step further comprises:
   disabling the airspeed limit from being used to control the level of thrust if the airspeed is greater than an airspeed threshold.

8. The method of claim 7, wherein the controlling step further comprises:
   re-enabling the airspeed limit after the airspeed limit has been disabled if the airspeed is less than a second threshold, wherein the groundspeed is valid and the command for the selected thrust mode is less than the airspeed limit.

9. The method of claim 1, wherein the groundspeed limit is selected from one of a table and a set of equations that provide the level of thrust based on the groundspeed.

10. The method of claim 1, wherein the airspeed limit is a hysteresis function.

11. The method of claim 1, wherein the groundspeed limit and the airspeed limit are only used while the aircraft is on a ground.

12. The method of claim 1 further comprising:
    displaying the selected thrust mode on a display device.

13. A method for controlling thrust provided to an aircraft, the method comprising:
    receiving, in a thrust control unit, a command for a selected thrust mode for the aircraft wherein the selected thrust mode comprises at least one of: takeoff thrust, and a maximum thrust;
    determining a lower thrust limit for the selected thrust mode, wherein the lower thrust limit for the selected thrust mode is based on factors comprising: a groundspeed of the aircraft, and an airspeed of the aircraft;
    responsive to receiving the command, controlling a level of thrust provided by an engine to the aircraft at a lesser of the selected thrust mode or the lower thrust limit for the selected thrust mode, wherein the controlling step comprises:
    determining whether a current groundspeed exceeds a first threshold;
    determining whether a current airspeed exceeds a second threshold;
    responsive to the current groundspeed exceeding the first threshold, disabling the groundspeed limit from being used to control the level of thrust; and
    responsive to the current airspeed exceeding the second threshold, disabling the groundspeed limit from being used to control the level of thrust.

14. The method of claim 13, wherein the selected thrust mode is a percentage of maximum thrust.

15. The method of claim 14, wherein the selected thrust mode is takeoff thrust.

16. The method of claim 13, wherein the factors determining the lower thrust limit for the selected thrust mode further comprise a determination of an undesired engine parameter before the undesired engine parameter occurs.

17. A method for avoiding undesired engine blade stress in an engine of an aircraft, the method comprising:
    receiving, in a thrust control unit, a command to provide a selected thrust mode, wherein the selected thrust mode comprises at least one of: takeoff thrust, and a maximum thrust;

determining a lower thrust limit for the selected thrust mode, wherein the determination is based on factors comprising: a determination of an undesired engine parameter before the undesired engine parameter occurs, a groundspeed of the aircraft, and an airspeed of the aircraft, wherein the undesired engine parameter comprises at least one of: an engine fan blade threshold, and an engine speed limit;

responsive to receiving the command, controlling a level of thrust provided by the engine at a lesser of the selected thrust mode and the lower thrust limit for the selected thrust mode, wherein the controlling the level of thrust comprises:

determining whether a current groundspeed exceeds a first threshold;

determining whether a current airspeed exceeds a second threshold;

responsive to the current groundspeed exceeding the first threshold, disabling the groundspeed limit from being used to control the level of thrust; and responsive to the current airspeed exceeding the second threshold, disabling the groundspeed limit from being used to control the level of thrust.

18. The method of claim 17, wherein the selected thrust mode is takeoff thrust for the engine while the aircraft is on a takeoff roll, and wherein the lower thrust limit for the selected thrust mode is continuously determined from before the takeoff roll until the aircraft is airborne and the command for the selected thrust mode is no longer received.

19. The method of claim 18, wherein the command to provide takeoff thrust is received with an aircraft wheel brake applied.

* * * * *